United States Patent [19]
Muenchinger

[11] 3,877,339
[45] Apr. 15, 1975

[54] LOBULAR SCREW WITH MEANS FOR IMPROVED STRESS DISTRIBUTION

[75] Inventor: Herman G. Muenchinger, South Dartmouth, Mass.

[73] Assignee: Research Engineering & Manufacturing, Inc., New Bedford, Mass.

[22] Filed: Dec. 7, 1973

[21] Appl. No.: 422,833

[52] U.S. Cl........................ 85/9 R; 151/35; 151/38
[51] Int. Cl............................................ F16b 39/26
[58] Field of Search ............ 85/9 R; 151/34, 35, 37, 151/38, 22

[56] References Cited
UNITED STATES PATENTS

| | | | |
|---|---|---|---|
| 179,931 | 7/1876 | Loomis | 151/38 |
| 1,406,423 | 2/1922 | Smith | 151/35 |
| 2,076,041 | 4/1937 | Payne | 85/9 R |
| 3,032,089 | 5/1962 | Gutshall | 151/35 |
| 3,221,792 | 12/1965 | Poupitch | 151/34 |

FOREIGN PATENTS OR APPLICATIONS

| | | | |
|---|---|---|---|
| 677,043 | 12/1963 | Canada | 151/38 |
| 392,412 | 6/1908 | France | 151/38 |
| 621,686 | 2/1927 | France | 151/37 |

*Primary Examiner*—Marion Parsons, Jr.
*Attorney, Agent, or Firm*—Olson, Trexler, Wolters, Bushnell & Fosse, Ltd.

[57] ABSTRACT

A screw, such as a self-tapping screw, comprises a threaded shank with a lobular cross-section and adapted for engagement with a mating thread of circular cross section. At the head end of the screw there is a bearing surface for pressure engagement against a member to be retained by the screw. This bearing surface has alternately arranged, circumferentially disposed recesses and ridges and with the recesses being in line with the lobes. Upon tightening of the screw at high torques the ridges engage the member to be retained and the recesses cause relief from stress concentrations at the lobes by permitting axial movement of the screw so as to increase the pressure flank areas of engagement of the screw and the mating thread. A more positive locking engagement of the thread is also provided. The bearing surface may be integral with the screw head or may be provided on a washer on the screw.

10 Claims, 12 Drawing Figures

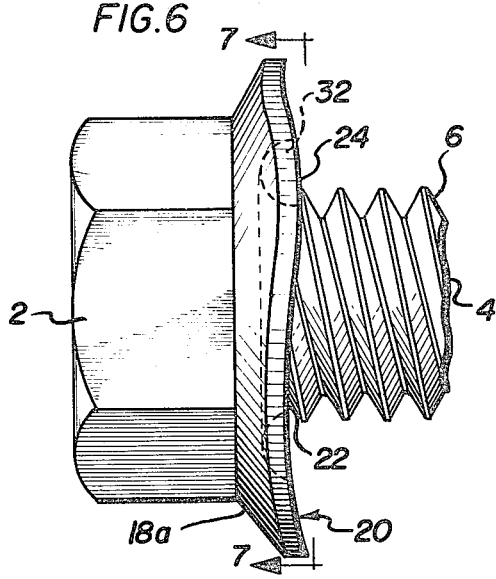
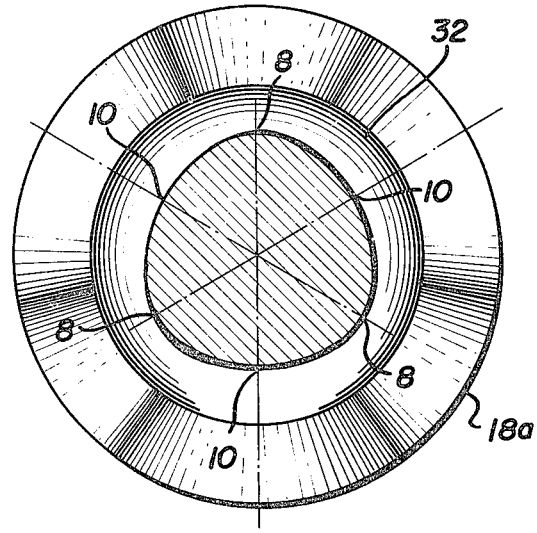
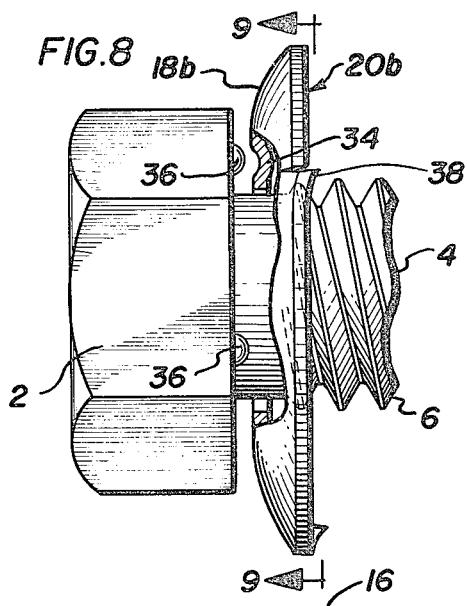
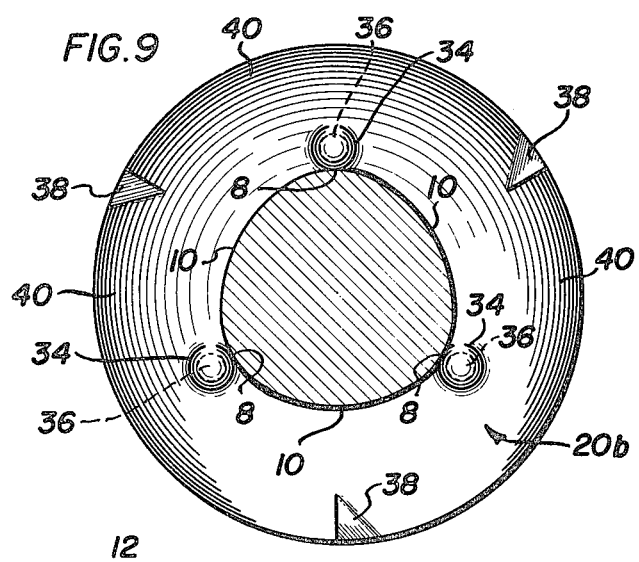
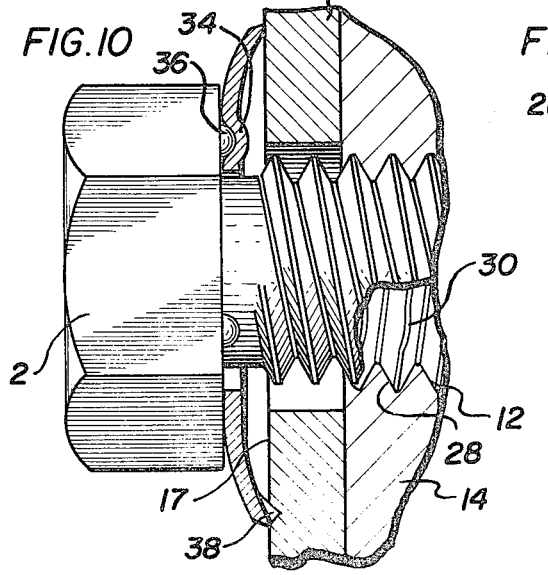
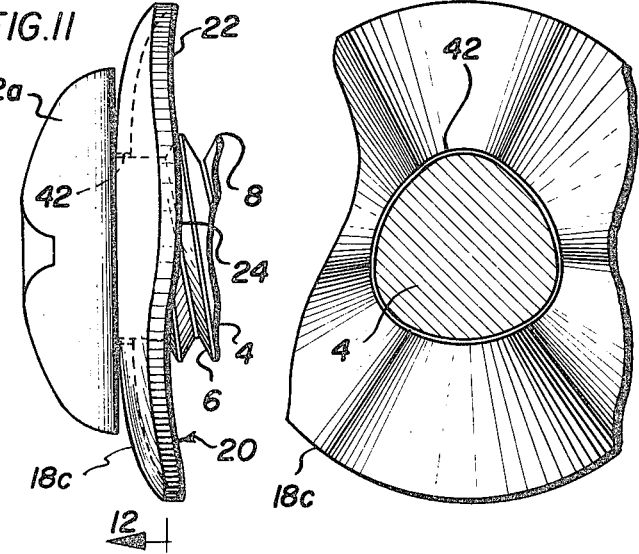

LOBULAR SCREW WITH MEANS FOR IMPROVED STRESS DISTRIBUTION

BACKGROUND OF THE INVENTION

This invention relates to improvements in screws of the type that are of lobular cross section, and more particularly to an arrangement which improves the stress distribution of such screws when they are tightened down to high torques in a workpiece. The invention is particularly applicable to self-tapping screws having a threaded shank of lobular cross section but the invention is also applicable to other types of lobular screws as well.

One well known type of self-tapping screw of lobular configuration is shown in the United States Patent to Phipard Jr., U.S. Pat. No. 3,195,156, issued July 20, 1965. In a screw of this type the thread on the shank has a number of circumferentially spaced thread-swaging lobes and intermediate arcuate sides which recede from the lobes to provide clearance or relief circumferentially between the lobes. Such a screw is lobular throughout its threaded shank. The lead or front end portion of the screw has lobes of progressively increasing radius from the center of the shank for purposes of facilitating progressive swaging of a thread of circular cross section in the workpiece. The part of the lobular thread proximate to the head of the screw usually does little if any threading but constitutes a holding section that engages the thread in the workpiece. Because the screw can be rolled from a lobular blank with conventional dies, it is relatively easy to manufacture and, together with its proven effectiveness, has resulted in the screw being widely used.

However, the contact of the screw thread in the holding section with the mating thread of the workpiece is essentially concentrated at the lobes. In the usual case there are three lobes, which is a design that has been found to be entirely satisfactory. In any event, the stress concentration is most pronounced when the screw is tightened with a relatively high torque. If the screw is tightened past a recommended torque for the particular application of the screw, a progressive failure of the internal thread of the workpiece takes place in the regions of the lobes. Moreover, once failure begins to take place it proceeds with very little if any additional torque. It is also possible for the screw thread to fail at the lobes but in most cases this would not take place since the threads of the screw are hardened, which is usually not the case in the workpiece.

OBJECTS AND SUMMARY OF THE INVENTION

It is an object of this invention to provide a screw of lobular cross section that embodies a bearing area at the head end of the screw that serves to relieve the stresses concentrated at the lobe so that upon final tightening of the screw there results an increased area of pressure flank engagement of the screw and workpiece threads.

It is a further object of this invention to provide a screw of the type stated which allows additional tightening of the screw, without thread failure, over and above that which would ordinarily be possible for conventional screws.

Another object of this invention is to provide a screw of the type stated which assures a more positive locking engagement between the thread of the screw and the thread of the workpiece than has heretofore been possible in screws of the type with which the present invention is concerned. Thus, the thread on the fastener and the internal thread of the workpiece may approach an undulating helical path with the result that the joint between the threads not only sustains an increased tensile stress, but also the screw is locked in a position which resists loosening.

A further object of this invention is to provide a screw of the type stated in which the aforesaid bearing surface for engagement with the member to be retained by the screw can be embodied into the head of the screw or can be formed on a washer that underlies the head of the screw.

In accordance with the foregoing objects the screw of the present invention comprises a head end and a threaded shank extending axially from the head end. The thread on the shank has a number of circumferentially spaced lobes and intermediate sides which recede from the lobes such that the normal engagement of the screw thread with a mating thread of a circular cross section is substantially localized at the lobes as the screw is driven into the mating thread. Means are formed at the head end providing an axially presented bearing surface against a member to be retained by the screw, said bearing surface having circumferentially spaced recesses presented toward the shank and substantially aligned with the lobes. The bearing surface also has ridges circumferentially intermediate the recesses and shaped such that tightening of the screw causes the ridges to engage the member to be retained and impose pressure thereon and the recesses provide relief to permit axial movement of the screw upon further tightening to increase the areas of pressure flank engagement of the screw thread with the mating thread.

The aforesaid bearing surface may be integral with the screw head or it may be on a washer that is axially intermediate the screw head and the part of the threaded shank that engages the workpiece.

BRIEF DESCRIPTION OF THE FIGURES

FIG. 6 is a fragmentary elevational view of a modified form of screw embodying the present invention;

FIG. 7 is a sectional view taken along line 7—7 of FIG. 6;

FIG. 8 is a fragmentary elevational view, partially in section, of another form of screw embodying the invention;

FIG. 9 is a sectional view taken along line 9—9 of FIG. 8;

FIG. 10 is a sectional view similar to FIG. 8 but showing the screw thereof in tightly threaded engagement with a workpiece;

FIG. 11 is a still further modified form of screw in accordance with the present invention; and FIG. 12 is a sectional view taken along line 12—12 of FIG. 11.

DETAILED DESCRIPTION

Figure 1:
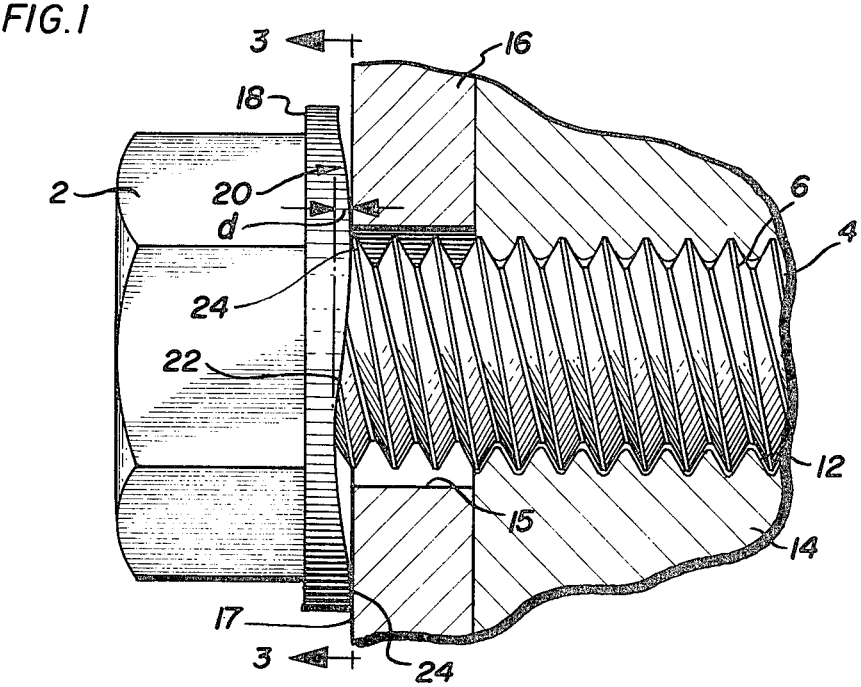
FIG. 1 is a side view partially in section and showing the screw after it has been initially threaded into a workpiece and partially tightened.

Referring now in more detail to the drawing, and in particular to FIGS. 1 - 5, there is shown a screw having a head 2 of hexagonal or other known configuration and an axially extending thread shank 4. The thread 6 on the shank 4 is of lobular configuration. Typically, the thread 6 is of the arcuate, lobular shape shown in FIG. 3 and comprises a number of circumferentially spaced lobes (in this instance three) which are circumferentially spaced equally and with intermediate arcuate sides 10, 10, 10 that recede from the lobes 8, 8, 8. The screw may be a fastener of the type for forming a mating thread 12 of cylindrical cross section in a workpiece 14. The thread 6 may be of the type shown and described in the aforesaid U.S. Pat. No. 3,195,196 although the invention is applicable to other types of lobular threads. Suffice it to say, however, that the screw swages the workpiece thread 12 through the action of the thread swaging lobes at the front portion of the screw so that when the screw is finally tightened down it will retain a member 16 against the workpiece 14. The hole 15 in the member 16 clears the screw thread.

In the form of the invention shown in FIG. 1 - 5 the head 2 integrally includes a washer or flange 18 that is axially interposed between the thread 6 and the head proper. The surface of the washer 18 that is presented toward the threaded shank 4 has a bearing surface 20 for engagement with the retained member 16. This bearing surface 20 is of generally undulating configuration having a series of relief portions or recesses 22 that are circumferentially separated by ridges 24. Preferably, the low points of the recesses 22 are respectively aligned with the lobes 8 while the high points of the ridges 24 are respectively aligned with the mid points of the arcuate sides 10.

Figure 4:
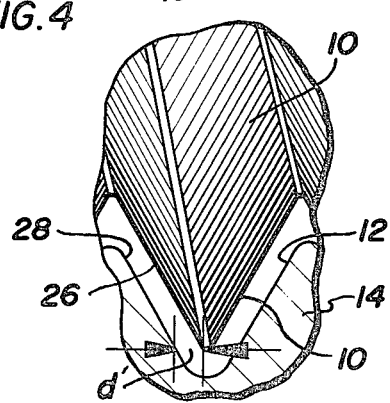
FIG. 4 is an enlarged fragmentary sectional view of a portion of FIG. 1.

As the screw is tightened, the high points on the ridges 20 will engage the outer surface 17 of the member 16. When the ridges are bearing firmly against the member 16, the pressure flanks of each lobe 8 will engage the adjacent pressure flank portions of the internal thread 12. However, as shown in FIG. 4, the pressure flank portion 26 of each of the arcuate sides 10 will be spaced from respective adjacent pressure flank portions 28 of the internal thread 12. This spacing will be the greatest at the mid points of the sides 10. Therefore, the stresses will be concentrated at the lobes 8 and at the pressure flank areas of the mating thread engaged thereby. Since these areas of engagement by the lobes 8 are relative small, stress concentrations will be present at these regions of the internal thread if the bearing surface 20 is flat, in accordance with usual practices, rather than being undulating in accordance with the present invention. Thus, if the bearing surface were flat further tightening of the screw might result in failure of the internal thread at the localized regions adjacent to the lobes 8.

Figure 2:
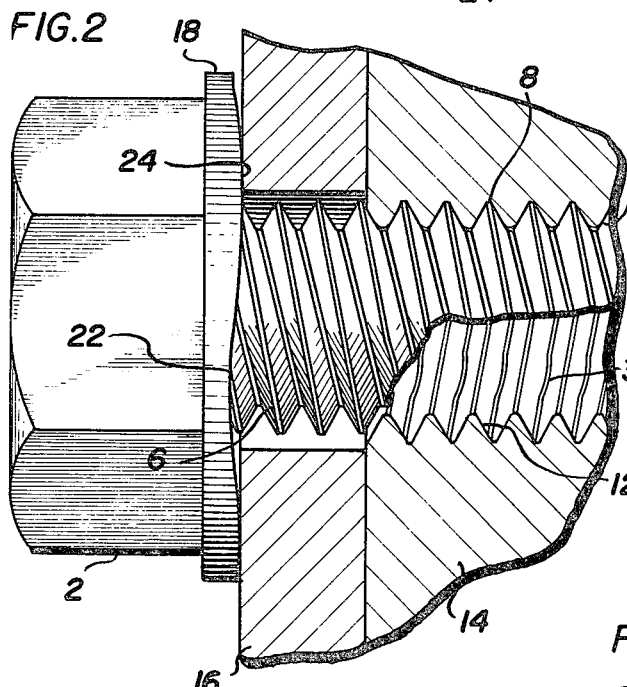
FIG. 2 is a view similar to FIG. 1 but showing the screw tightened down fully into the workpiece.
Figure 3:
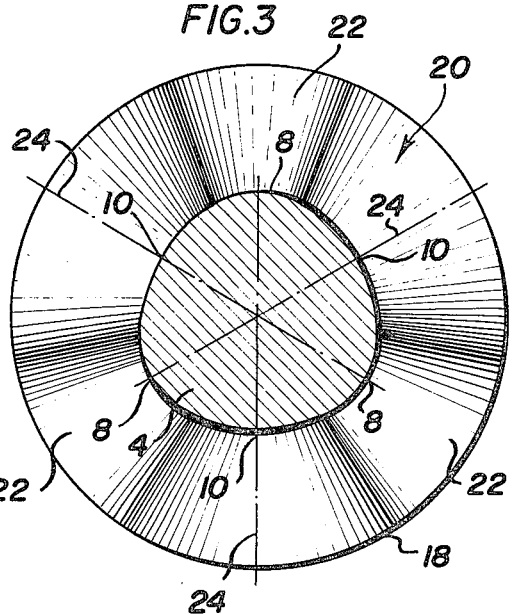
FIG. 3 is a sectional view taken along line 3—3 of FIG. 1.
Figure 5:
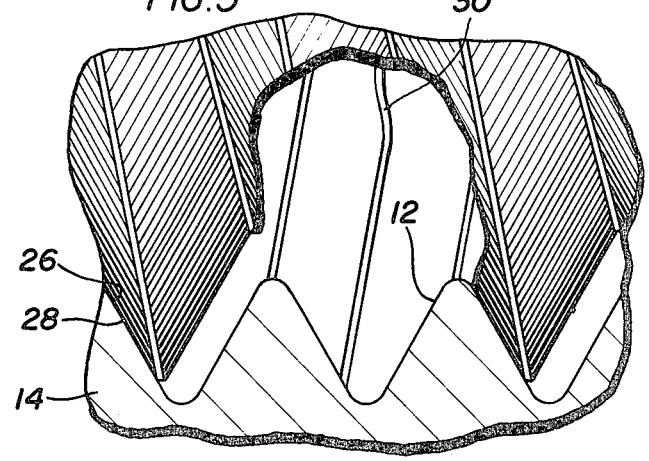
FIG. 5 is a fragmentary sectional view of a portion of FIG. 2.

However, the tightening of the screw further to the positions shown in FIGS. 2 and 5 results in flattening of the ridges 24 or deformation of the surface 17 of the member 16 or possibly both. This is permitted by the recesses 22. This further tightening of the screw tends to move the screw axially an amount sufficient to bring substantial portions of the pressure flanks 26 at the sides 10 into engagement with the pressure flank portions 28 of the internal thread 12, as shown in FIG. 5. This, of course, increases the overall pressure flank areas of engagement between the screw thread 6 and the internal thread 12. As a result, stress concentrations are relieved and the effective tensile strength of the screw is also increased. Furthermore, the torque at which the screw will fail tends to be increased.

The depth of the relief or recesses 22 should equal or exceed the thread clearance between the screw thread 6 at the sides 10 and the mating thread 12 that results from the out of round condition of the screw thread. Thus the axial distance $d$ between the high points of the ridges and the low points of the recesses 22 should be equal to or greater than the axial thread clearance $d'$ shown in FIG. 4. The dimension $d'$ in FIG. 4 is out of scale relative to the dimension $d$. Viewed another way, the axial extent of the ridges and recesses are exaggerated and this is done for clarity of illustration.

When the screw undergoes the axial movement, as aforesaid, the axial pressure applied to the internal thread 12 by the lobes 8 tend to deform the thread, as indicated at 30 in FIG. 5, into an undulating helix. This undulating helix is shown exaggerated simply for purposes of illustration. In any event, the undulating helix results in a joint between the threaded pieces that not only sustains greater tensile strength but causes the screw to be, in effect, molded into locked position with the mating internal thread so as to resist loosening of the threads.

In the screw shown in FIGS. 6 and 7, the integral washer or flange 18a on the head 2 is somewhat conical in shape and includes an annular undercut or groove 32 that is presented toward and surrounds the threaded shank 4. This undercut or groove 32 enhances the resiliency of the flange 18a. Thus, when the screw is tightened down into the workpiece the flange 18a is normally elastically deformed as will also be the case of the screw thread 6 at the lobes 8. Generally speaking the workpiece and/or the member 16 will be plastically deformed. However, any one or more of the screw, the workpiece, and the retained member can be either elastically or plastically deformed depending upon the nature of the materials, their geometric configurations, hardnesses and other factors. Nevertheless, the provision of the recesses 22 serve to increase the areas of pressure flank engagement between the screw and the workpiece.

In the form screw shown in FIGS. 8 - 10 the bearing surface 20b is on a washer 18b that is axially intermediate the head 2 and the screw thread 6. The washer 18b is rotatable relative to the screw head 2 and the shank 4 and may or may not be captive on the screw although the former is preferred. The washer 18b may be of a resilient material and of generally conical configuration. Furthermore, the washer 18b is formed with several circumferentially spaced detents which, for example, may be three in number and which are equally spaced as shown in FIG. 9. The underside of the head 2 is integrally formed with a like number of equally spaced protuberances 36 which are adapted to engage respectively in the detents 34 so as to couple the washer 18b for driving purposes through the head 2, as shown in FIG. 10. The protuberances 36 are formed in alignment with the lobes 8 of the screw thread as shown in FIG. 9.

In the screw of FIGS. 8 - 10 the washer 18b has a bearing surface 20b with recesses and ridges having high and low regions for the purposes previously described. However, the ridges are formed by axially struck teeth 38 while the recesses are formed, in effect, by the portions 40 of the bearing surface 20b circumferentially therebetween. The high points or tips of the teeth 38 are preferably midway circumferentially intermediate the detents 34 resulting in low recess regions intermediate the teeth 38.

When the screw of FIGS. 8 – 10 is initially threaded into the workpiece 14, the screw may be rotatable relative to the washer 18b until the teeth 38, 38, 38 engage the surface 17 of the members 16. This temporarily retains the washer 18b from rotation. Upon further rotation of the screw, the protuberances 36, 36, 36 will engage the respective detents 34, 34, 34 to insure proper alignment of the washer relative to the lobular thread 6. Thus, the teeth 38, 38, 38 will be aligned with the sides 10, 10, 10 while the regions 40, 40, 40 constituting the recesses will be aligned with the respective lobes 8, 8, 8. Upon further tightening of the screw the washer 18b rotates therewith further biting into the member 16. However, the clearance or recesses provided by the surface portion 40, 40, 40 serve to relieve the stresses at the lobes 8, 8, 8 so that at least substantial portions of the pressure flanks 26, 28 engage when the screw is fully tightened as shown in FIG. 10.

FIGS. 11 and 12 show a still further modified form of screw in which the washer 18c has a smooth undulating bearing surface 20 like the flange 18 on the washer 18a. The washer 18c is separate from the screw head 2a but is held captive between the head 2a and the part of the thread 6 that engages the workpiece. The washer 18c has a lobular central hole 42 for engagement with the lobular shank 4 so that the washer is driven with the screw. In place of a lobular hole 42 the washer may have a hole of any appropriate geometry (e.g., square, eliptical, etc.) to prevent relative rotation between the washer and the screw. In any event, the washer 18c is positioned on the screw so that the recesses 22 are aligned with the thread lobes 8, respectively while ridges 24 are algined respectively with the arcuate sides 10. Such washers 18c may be applied to known screws to derive the benefits of this invention.

What is claimed is:

1. A screw comprising a head end and a thread shank extending axailly from said head end, the thread on said shank having a number of circumferentially spaced lobes and intermediate sides which recede from the lobes such that the normal engagement of said screw thread with a mating thread of circular cross-section is substantially localized at said lobes as the screw is driven into the mating thread, and means at said head end forming an axially presented surface for bearing against a member to be retained by said screw, said bearing surface having circumferentially spaced recesses presented toward said shank and with the recesses being substantially aligned with said lobes, and said bearing surface also having ridges circumferentially intermediate said recesses and shaped such that tightening of the screw causes said ridges to engage said member to be retained and impose pressure thereon and said recesses provide relief to permit axial movement of the screw upon further tightening to increase the areas of pressure flank engagement of the screw thread with the mating thread.

2. A screw according to claim 1 in which said bearing surface is on a head at said head end and is of an undulating shape to define said recesses and ridges.

3. A screw according to claim 2 in which said bearing surface is on a resilient flange on said head.

4. A screw according to claim 3 in which said flange is formed with a groove to enhance its resiliency.

5. A screw according to claim 1 in which said bearing surface is on a washer that is axailly intermediate a head at said head end and at least part of said screw thread, said washer being rotatable relative to said head and shank, and cooperating means on the head and washer for aligning said recesses with said lobes upon tightening said screw against said member to be retained.

6. A screw according to claim 5 in which said ridges are formed by teeth on said washer and said recesses are formed by portions of the washer circumferentially intermediate said teeth.

7. A screw according to claim 1 which is a screw having means for forming the mating thread.

8. A screw according to claim 1 in which the axial distance between high regions of the ridges and low regions of the recesses is at least substantially the axial clearance between the pressure flanks of the screw thread and the mating thread at said sides when the said high regions engage said member to retained.

9. A screw according to claim 1 in which said bearing surface is on a washer that is on said shank at said head end, and there are cooperating means on said washer and on a part of said screw for orienting the washer such that the recesses are respectively aligned with said lobes and the washer is turned by the screw as the latter is driven into the workpiece.

10. A screw according to claim 9 in which said washer is of undulating shape to define said ridges and recesses.

* * * * *